L. J. CLOUTIER.
BLOW TORCH.
APPLICATION FILED FEB. 27, 1913.

1,077,391.

Patented Nov. 4, 1913.

Witnesses.
Albert G. Pucginthowski
Marguerite H. Livsey

Inventor.
Louis J. Cloutier
By Horatio E. Bellows
Attorney.

UNITED STATES PATENT OFFICE.

LOUIS J. CLOUTIER, OF PROVIDENCE, RHODE ISLAND.

BLOW-TORCH.

1,077,391.

Specification of Letters Patent. Patented Nov. 4, 1913.

Application filed February 27, 1913. Serial No. 750,957.

*To all whom it may concern:*

Be it known that I, LOUIS J. CLOUTIER, a citizen of the United States, residing at Providence, in the county of Providence and State of Rhode Island, have invented certain new and useful Improvements in Blow-Torches, of which the following is a specification.

My invention relates to blow torches employed by plumbers, electricians, jewelers and others for soldering or brazing purposes. In these structures are two adjacent compartments one of which supports a wick and the supply of inflammable fuel, while the second compartment carries a blow pipe directed transversely of the wick and is supplied with a fuel which is directed through the blow pipe upon the flame of the wick to enhance the heat of the flame.

The objects of my invention are essentially to afford in a single structure means for supplying at will either an air current solely through the blow pipe, an inflammable vapor current solely, any desired mixture of oxygen and vapor, or to entirely cut off the supply of both to the flame; also to protect the operator from any accidental inhalation from the blow pipe of any vapor.

A further object is to provide a self igniting means for the wick which will dispense with the necessity of use of matches or any other lighting agent; also to arrange the combined parts in such a manner as to accupy a minimum of space. And finally it is purposed to attain these ends in a simple and inexpensive structure.

To the above ends essentially my invention consists in such parts and such combinations of parts as fall within the scope of the appended claims.

Figure 1:
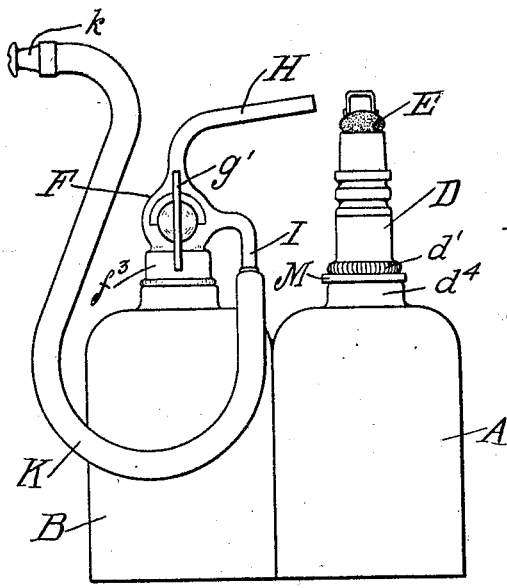
Figure 2:
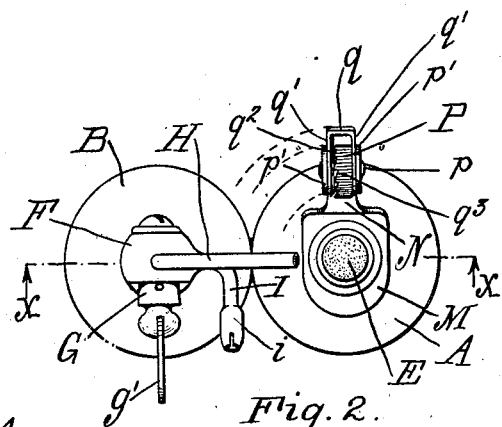
Figure 3:
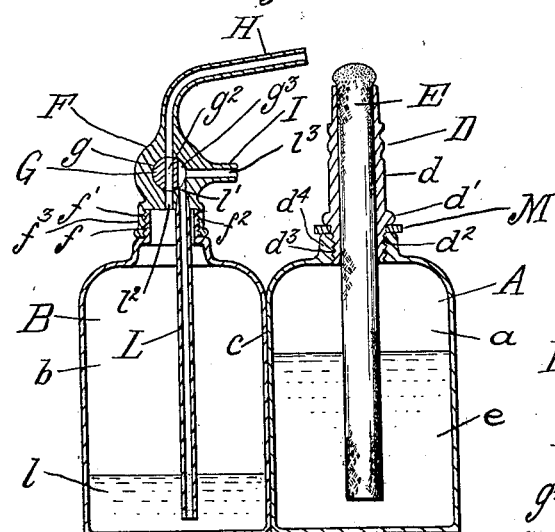
Figure 4:
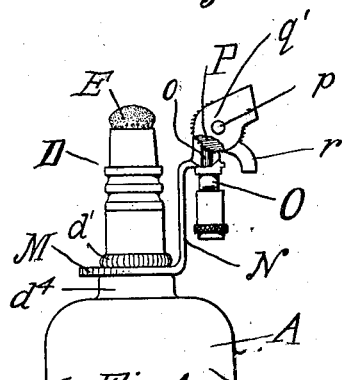
Figure 5:
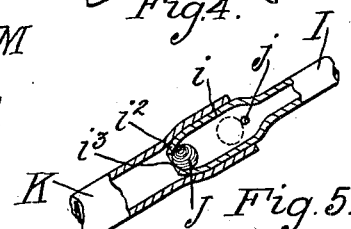
Figures 6, 7, 8:
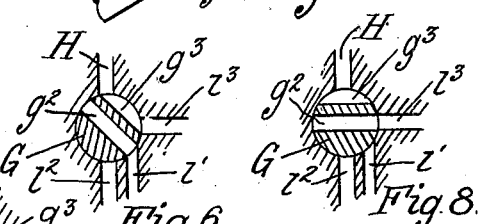

In the accompanying drawings which form a part of this specification:—Figures 1 and 2 are front and plan elevations respectively of my novel torch, the flexible blow pipe being omitted in Fig. 2, Fig. 3, a section on line $x$—$x$ of Fig. 2, Fig. 4, an end elevation of the torch, Fig. 5, a detailed partially sectional view of the check valve, and Figs. 6, 7, and 8, enlarged sections of the blow pipe valve in different positions of operation.

Like reference characters indicate like parts throughout the views.

In detail my device consists of a casing comprising two compartments which may be arranged adjacent each other in any preferred desired manner and may be of any preferred contour. In the present instance the casing comprises two receptacles A and B, of tubular form inclosing respectively chambers $a$ and $b$, and rigidly connected with each other by solder or otherwise as at $c$. These receptacles are provided with retracted upper portions, and the receptacle A is provided with a neck portion D. In the present instance the neck portion consists of a tube $d$ provided intermediate its length with an external annular shoulder $d'$ and at its lower end with a threaded portion $d^2$ adapted to engage in a thread orifice $d^3$ in a shoulder portion $d^4$ constituting a part of the upper portion of the receptacle A. Frictionally held in the neck D is a wick E depending into the chamber $a$ which is partially filled with an inflammable liquid such as alcohol $e$ or with an absorbent material containing an inflammable agent adapted to supply the wick with fuel. The upper portion of the receptacle B is provided with a retracted portion $f$ provided with external threads $f'$ adapted to engage internal threads $f^2$ upon the downwardly extended flange portion $f^3$ of a valve casing F. The valve casing has a cylindrical bore or seat $g$ and a cylindrical valve G rotatable in its seat $g$ by a projecting handle $g'$. The valve comprises a diametrical opening or passage $g^2$ and a second passage $g^3$ parallel with the first and open at the periphery of the valve.

Integral with the upper extremity of the valve casing is an inclined blow pipe tube or nozzle H directed across the top of the neck portion D of the receptacle A, in such a manner that any current directed through the nozzle will intersect a flame upon the wick E. Integral with the side of the valve casing F is a downwardly inclined tube or pipe I provided at its lower end with an enlarged portion $i$ which is retracted near its extremity as at $i^2$ to form a valve seat and also forming an aperture $i^3$ in its lower extremity. Resting by gravity in the seat $i^2$ is a ball valve J, shown in detail in Fig. 5, which is of greater diameter than the opening $i^3$ and the interior diameter of the tube I, but is of less diameter than the breadth of the enlarged portion $i$ of the tube, so that when the ball is lifted it will move upwardly and unseat itself to permit the passage of air upwardly through the opening $i^3$, but is checked against excessive upward travel by a transverse pin $j$ fixed in the upper portion of the enlarged part *i*. The valve is shown in the last described position in broken lines in Fig. 5. A flexible section of rubber or other suitable material K frictionally engages the enlarged portion *i* of the metal portion I of the complete or supply tube; and fixed in the end of the flexible member K is the usual mouthpiece *k*. Integral with or fixed in the bottom portion of the valve casing F is a depending tube L which extends nearly to the bottom of the chamber *b* which is supplied with a hydro-carbon or other fuel *l* which fuel may be absorbed in waste or similar material. A vertical passage *l'* connects the tube L with the peripheral groove or passage $g^3$ of the valve G; and a parallel passage $l^2$ extends from the lower face of the valve casing F to the seat *g* of the valve. A passage $l^3$ in the valve casing F extends from the seat *g* into the tube I.

Rotatably mounted upon the neck D of the receptacle A is a flat ring M located intermediate the shoulder *d'* of the tube *d* and the shoulder $d^4$ of the receptacle, and integral with an upwardly and outwardly directed arm N upon whose outer end is fixed a tubular receptacle or casing O of a sparking device of any desired construction. In the present instance the tube O carries the usual agent consisting of a bar *o* of pyrophoric alloy in contact with the friction disk P mounted in contact therewith upon a pivot pin *p* mounted in the ears *p'* upon the upper portion of the tube O. To facilitate the rotation of the disk P a hood *q* has its sides *q'* pivoted upon the pin *p*. Upon the inner surface of one of the sides *q'* are teeth $q^2$ engaging the marginal teeth $q^3$ in the face of the disk P, so that when the finger projection *r* integral with the hood *q* is downwardly pressed the interengaging teeth serve to rotate the disk P. Obviously the hood *q* may be omitted, and any preferred construction of agent may be employed upon the arm N, it being essential only that the sparking disk shall be located in proximity with the wick E.

The operation of my device is as follows. After the wick E is lighted the operator blows through the tube K, and in so doing elevates the check valve J permitting the air to pass through the tube I, and the air or vapor ultimately emerges from the tube H either pure or mixed, and forces the flame substantially horizontally to the point where it is desired. It is convenient in some instances that air alone be forced against the flame to direct the same, particularly when an increase in temperature of the flame is not desired. At other times it is essential that the flame be raised to an exceedingly high temperature, and then it is essential that the current directed against the flame be the inflammable vapor. When an intermediate degree of heat intensity is desired the vapor and oxygen are mixed. When the device is not in use it is preferable that none of the contents of the chamber *b* escape. In order to secure the changes in character of the discharge from the tube H the valve G is operated. When a discharge of inflammable vapor is sought the air passes through the pipes K and I, the passage $l^3$, the valve passage $g^3$, the passage $l'$, the tube L, and upwardly through the passages $l^2$, $g^2$, and the tube H, all as shown in Fig. 3. When however a blast of air only is desired the operator while still blowing through the mouthpiece *j* gives a slight turn to the valve handle *g'*, turning the valve to an inclined position, and, as shown in Fig. 6, the passage *l'* is cut off thus discontinuing the supply of inflammable fuel, and the passage of the air is through the passages $l^3$, $g^3$ and the tube H. When a mixture of vapor or air is desired the valve G is still further turned to the position shown in Fig. 7. In Fig. 8 is shown the position of the valve cutting off all communication of the tube H from either the air passage $l^3$ or vapor passage $l^2$. Thus, by turning the valve G slightly to various degrees of rotation the force of the current upon the flame, and the various degrees of heat of the flame can be perfectly and instantaneously controlled during the process of applying the flame to the work.

The return of the check valve J by gravity to its seat $i^2$ prevents any accidental inhalation by the operator of any vapor while the valve G is in position to permit the operation of the device with vapor.

The pivotal character of the ring M and the arm N supporting the sparking device permits the latter to be swung around when not in use in the path shown in broken lines in Fig. 2 whereby it is brought into a position approximately intermediate the tubes D and H, thereby rendering the entire device much more compact. A rotation of the disk P as already suggested impels a spark to the wick E and thus produces the flame.

What I claim is:—

1. In a blow torch, the combination with a receptacle and a wick therein, of a second receptacle connected with the first receptacle, a valve casing upon the second receptacle, a valve mounted in the valve casing, a blow pipe nozzle upon the valve casing communicating with the valve and directed over the wick, and an air inlet tube upon the valve casing said valve serving to control the flow of air and vapor.

2. In a blow torch, the combination with a receptacle and a wick therein, of a second receptacle connected with the first receptacle, a valve casing on the second receptacle, a valve in the casing, a blow pipe nozzle upon the casing directed over the wick and communicating with the second receptacle through the valve, and an air supply tube upon the casing communicating with the second receptacle through the valve said valve serving to control the flow of air and vapor.

3. In a blow torch, the combination with a receptacle and a wick therein, of a second receptacle connected with the first receptacle, a valve casing on the second receptacle, a valve in the casing, a blow pipe nozzle upon the casing directed over the wick and communicating with the second receptacle through the valve, and an air supply tube upon the casing communicating with the nozzle through the valve said valve serving to control the flow of air and vapor.

4. In a blow torch, the combination with a receptacle and a wick therein, of a second receptacle connected with the first receptacle, a valve casing on the second receptacle, a valve in the casing, a blow pipe nozzle upon the casing directed over the wick and communicating with the second receptacle through the valve, an air supply tube upon the casing communicating with the valve, and a check valve in the tube said valve serving to control the flow of air and vapor.

5. In a blow torch, the combination with a receptacle and a wick therein, of a second receptacle connected with the first receptacle, a valve casing on the second receptacle, a rotary valve in the casing provided with two transverse openings, a blow pipe nozzle upon the casing directed over the wick and communicating with the valve, an air supply tube upon the valve casing communicating with the valve, and a pipe in the casing extending into the second receptacle and communicating with the valve, said casing being provided with a passage leading from the valve into the second receptacle.

6. In a blow torch, the combination with a receptacle and a wick therein, of a second receptacle connected with the first receptacle, a valve casing on the second receptacle, a valve in the casing, a blow pipe nozzle upon the casing directed over the wick and communicating with the second receptacle through the valve, a downwardly directed air supply tube upon the casing communicating with the valve, said tube being enlarged a portion of its length to constitute a valve seat, and a ball in the enlarged portion.

7. In a blow torch, a receptacle having a wick therein, a second receptacle in proximity thereto, a valve casing on the second receptacle having an air inlet, a blow nozzle on said casing, a downwardly directed tube within the second receptacle, and a rotary valve in said casing having a multiplicity of passages, said valve being located opposite said air inlet and rotatable to control the flow of air and vapor.

8. In a blow torch, a receptacle having a wick therein, a second receptacle in proximity thereto, a valve casing on the second receptacle having an air inlet, a blow nozzle on said casing, a downwardly directed tube within the second receptacle, a rotary valve in said casing having a multiplicity of passages, said valve being located opposite said air inlet and rotatable to control the flow of air and vapor, a blow pipe connected with the air inlet, and a gravitating check valve for preventing return of fumes to the mouth of the operator.

9. In a blow torch, two independent receptacles arranged in proximity to each other, one provided with a wick and the other with a valve casing, a tube depending from the valve casing, a blow nozzle communicating with said casing, an air inlet to said casing, a communication between said casing and the interior of the receptacle, a rotary valve in said casing controlling the air inlet, the blow nozzle and said passage to the receptacle, a blow pipe connected with the air inlet and an automatically actuated gravitating valve preventing passage of the fumes to the mouth of the operator.

In testimony whereof I have affixed by signature in presence of two witnesses.

LOUIS J. CLOUTIER.

Witnesses:
HORATIO E. BELLOWS,
WASHINGTON R. PRESCOTT.